United States Patent

Inomata

(10) Patent No.: US 9,470,790 B2
(45) Date of Patent: Oct. 18, 2016

(54) COLLISION DETERMINATION DEVICE AND COLLISION DETERMINATION METHOD

(75) Inventor: Ryo Inomata, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/424,057

(22) PCT Filed: Sep. 3, 2012

(86) PCT No.: PCT/JP2012/072364
§ 371 (c)(1),
(2), (4) Date: Feb. 26, 2015

(87) PCT Pub. No.: WO2014/033956
PCT Pub. Date: Mar. 6, 2014

(65) Prior Publication Data
US 2015/0219761 A1    Aug. 6, 2015

(51) Int. Cl.
*G01S 13/93* (2006.01)
*G01S 13/86* (2006.01)
*G08G 1/16* (2006.01)

(52) U.S. Cl.
CPC ............ *G01S 13/931* (2013.01); *G01S 13/867* (2013.01); *G08G 1/166* (2013.01)

(58) Field of Classification Search
CPC ......... G08G 1/16; G08G 1/166; G08G 1/167
See application file for complete search history.

(56) References Cited

U.S. PATENT DOCUMENTS

| 4,906,940 | A | * | 3/1990 | Greene | ............ G06K 9/00798 382/100 |
| 6,226,593 | B1 | * | 5/2001 | Kurz | ........................ B60T 7/22 340/436 |
| 6,259,992 | B1 | | 7/2001 | Urai et al. | |
| 6,405,132 | B1 | * | 6/2002 | Breed | .................... B60N 2/002 701/117 |
| 2007/0080850 | A1 | | 4/2007 | Abe et al. | |
| 2014/0186052 | A1 | * | 7/2014 | Oshima | ............ H04B 10/1143 398/130 |
| 2015/0262375 | A1 | * | 9/2015 | Inomata | ............. G06K 9/00805 382/107 |

FOREIGN PATENT DOCUMENTS

| JP | 2000-057497 A | 2/2000 |
| JP | 2005-084034 A | 3/2005 |

* cited by examiner

*Primary Examiner* — Adam Tissot
*Assistant Examiner* — Paul Castro
(74) *Attorney, Agent, or Firm* — Sughrue Mion, PLLC

(57) ABSTRACT

A collision determination device includes a radar detection unit that detects an object in front of a vehicle by a radar wave, an image detection unit that images in front of the vehicle and detects the object by the imaged image, and a collision determination unit that determines a collision between the vehicle and the object based on a combined target generated using a detection result of the radar detection unit and a detection result of the image detection unit. The collision determination unit performs collision determination with a speed of the object in the traveling direction of the vehicle as zero when the vehicle decelerates.

18 Claims, 5 Drawing Sheets

COLLISION DETERMINATION DEVICE AND COLLISION DETERMINATION METHOD

CROSS REFERENCE TO RELATED APPLICATIONS

This is a National Stage of International Application No. PCT/JP2012/072364 filed Sep. 3, 2012, the contents of which are incorporated herein by reference in its entirety.

TECHNICAL FIELD

The present invention relates to a collision determination device and a collision determination method for determining a collision between a vehicle and an object.

BACKGROUND ART

In the related art, as a collision determination device and a collision determination method, for example, as disclosed in Japanese Unexamined Patent Application Publication No. 2005-84034, a device and a method are known, in which a combined target of an object is generated using a detection result of a radar sensor and a detection result of an image sensor, and the collision between the vehicle and the object is determined based on the generated combined target.

CITATION LIST

Patent Literature

[Patent Literature 1] Japanese Unexamined Patent Application Publication No. 2005-84034

SUMMARY OF INVENTION

Technical Problem

In such a device and method, a speed of an object cannot be accurately calculated due to a decrease in tracking accuracy at the time of deceleration, and it is assumed that an image detection accuracy is lower than that at the time of constant speed traveling. Thus, a collision determination performed based on an image detection result is influenced by the lower accuracy.

Therefore, the present invention provides a collision determination device and a collision determination method in which the influence on the collision determination caused by a decrease in image detection accuracy can be suppressed.

Solution to Problem

A collision determination device according to the present invention includes: a radar detection unit configured to detect an object in front of a vehicle by a radar wave; an image detection unit configured to image in front of the vehicle and detect the object by the imaged image; and a collision determination unit configured to determine a collision between the vehicle and the object based on a combined target generated using a detection result of the radar detection unit and a detection result of the image detection unit. The collision determination unit performs collision determination with a speed of the object in the traveling direction of the vehicle as zero when the vehicle decelerates.

In this way, when the vehicle decelerates, since the collision with the object is determined with the speed of the object in the traveling direction of the vehicle as zero, in a case where the determination subject is an object that is almost not moving in the traveling direction of the vehicle such as a crossing pedestrian, even though the image detection accuracy decreases due to the deceleration of the vehicle, the influence on the collision determination can be suppressed.

In addition, in a case where it is determined that the speed of the object in the traveling direction of the vehicle before the vehicle decelerates is zero based on the detection result of the image detection unit, the collision determination unit may perform the collision determination with the speed of the object in the traveling direction of the vehicle as zero when the vehicle decelerates. In this way, even in a case where the object is not detected by the radar detection unit, the collision determination can be performed effectively.

In a case where it is determined that the speed of the object in the direction crossing the traveling direction of the vehicle before the vehicle decelerates exceeds zero further based on the detection result of the image detection unit, the collision determination unit may perform the collision determination with the speed of the object in the traveling direction of the vehicle as zero when the vehicle decelerates. In this way, the collision determination can be performed with high accuracy when confirming that the object is, for example, a crossing pedestrian.

In addition, in a case where it is determined that the speed of the object in the traveling direction of the vehicle before the vehicle decelerates is zero based on the detection result of the radar detection unit, the collision determination unit performs the collision determination with the speed of the object in the traveling direction of the vehicle as zero when the vehicle decelerates. In this way, even in a case where the object is not detected by the radar detection unit when the vehicle decelerates, the collision determination can be performed effectively using a past detection result of the radar detection unit.

In addition, in a case where it is determined that the speed of the object in the traveling direction of the vehicle before the vehicle decelerates is zero based on the combined target, the collision determination unit may perform the collision determination with the speed of the object in the traveling direction of the vehicle as zero when the vehicle decelerates. In this way, even in a case where the combined target is not generated when the vehicle decelerates, the collision determination can be performed effectively using a past combined target.

In addition, in a case where the object is not detected by the radar detection unit, the collision determination unit performs the collision determination with the speed of the object in the traveling direction of the vehicle as zero when the vehicle decelerates. In this way, even in a case where the object is not detected by the radar detection unit and the combined target is not generated, the collision determination can be performed effectively.

In addition, in a case where the object exists outside a detection range of the radar detection unit and within a detection range of the image detection unit, the collision determination unit may perform the collision determination with the speed of the object in the traveling direction of the vehicle as zero when the vehicle decelerates. In this way, even in a case where the combined target is not generated because the object has deviated from the detection range of the radar detection unit, the collision determination can be performed effectively.

In addition, in a case where it is determined that the object is a pedestrian crossing in front of the vehicle, the collision determination unit may perform the collision determination with the speed of the object in the traveling direction of the vehicle as zero when the vehicle decelerates. In this way, the collision determination can be performed with high accuracy when confirming that the object is, for example, a crossing pedestrian.

In addition, the radar detection unit may detect the object in front of the vehicle by a millimeter wave.

A collision determination method, in which a detection of an object in front of a vehicle is performed by a radar wave and a detection of the object is performed by an imaged image in front of the vehicle, and in which a collision between the vehicle and the object is determined based on a combined target generated using a detection result of the radar detection unit and a detection result of the image detection unit, includes performing collision determination with the speed of the object in the traveling direction of the vehicle as zero when the vehicle decelerates.

Advantageous Effects of Invention

According to the present invention, it is possible to provide a collision determination device and a collision determination method in which the influence on the collision determination caused by the decrease in image detection accuracy can be suppressed.

DESCRIPTION OF EMBODIMENT

Figure 1:
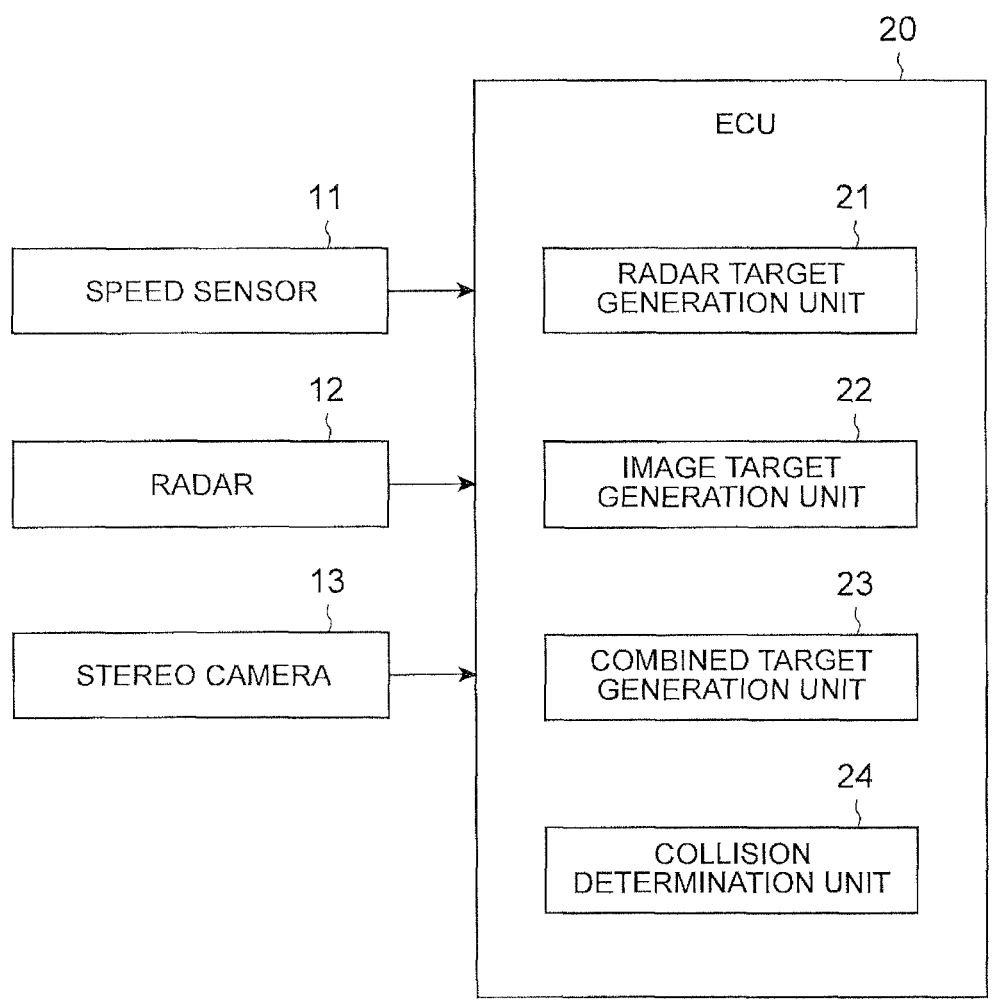
FIG. 1 is a block diagram illustrating a configuration of a collision determination device in an embodiment of the present invention.

Hereinafter, an embodiment of the present invention will be described in detail referring to the drawings attached hereto. In the description of the drawings, the same reference signs will be assigned to the same elements and duplicated descriptions will be omitted.

First, a configuration of a collision determination device in the embodiment of the present invention will be described referring to FIG. 1 and FIG. 2. The collision determination device is a device that is mounted on a vehicle and determines a collision between the vehicle and an object using a radar sensor and an image sensor.

FIG. 1 is a block diagram illustrating a configuration of a collision determination device in an embodiment of the present invention. As illustrated in FIG. 1, the collision determination device includes a speed sensor 11, a radar 12, stereo camera 13, and an electronic control unit (ECU) 20.

The speed sensor 11 detects a speed of a vehicle. As the speed sensor 11, for example, a wheel speed sensor is used. The speed sensor 11 supplies the detected vehicle speed to the ECU 20.

The radar 12 functions as a radar detection unit (radar sensor) that detects an object in front of the vehicle by a radar wave, transmits the radar wave (electromagnetic wave) to in front of the vehicle and receives the radar wave reflected from the object. As the radar 12, for example, a microwave radar, a millimeter wave radar, an ultrasonic wave radar, or a laser radar is used. The radar 12 supplies radar detection information indicating the detection result of the object to the ECU 20.

The stereo camera 13 function as an image detection unit (image sensor) that images in front of the vehicle and detects the object by the imaged image. As the stereo camera 13, for example, a charge-coupled device (CCD) or a complementary metal-oxide semiconductor (CMOS) is used. The stereo camera 13 are installed on the front surface or in the cabin of the vehicle as a plurality of cameras. The stereo camera 13 supply the image detection information indicating the detection result of the object to the ECU 20. A single camera may be used instead of the stereo camera 13.

The ECU 20 includes a radar target generation unit 21, an image target generation unit 22, a combined target generation unit 23, and a collision determination unit 24. The ECU 20 is mainly formed of a CPU, a ROM, a RAM, and the like, and realizes the functions of the radar target generation unit 21, the image target generation unit 22, the combined target generation unit 23 and the collision determination unit 24 through an execution of a program by the CPU. The ECU 20 may be configured as a single unit or may be configured as a plurality of units.

The radar target generation unit 21 generates a radar target based on the radar detection information from the radar 12. The radar target includes target information related to a distance to an object and a lateral position of the object that can be obtained from coordinates with the vehicle as a reference.

The target information of the radar target is calculated based on the radar detection information from the radar 12. A distance to the object indicates a distance from the vehicle (radar 12) to the object in a traveling direction of the vehicle, and is calculated based on the time between the time of transmitting the radar wave from the radar 12 and the time of receiving the wave reflected from the object. A lateral position of the object indicates a distance to the object from the vehicle (radar 12) in a direction orthogonal to the traveling direction of the vehicle, and is calculated based on the direction (angle) of the radar wave reflected from the object and received. The lateral position in the radar target is information of the position of the object detected by the radar 12 and does not include the information of a lateral width of the object.

The image target generation unit 22 generates an image target based on the image detection information from the stereo camera 13. The image target includes target information related to a distance to an object and a lateral position of the object that can be obtained from coordinates with the vehicle as a reference.

The target information of the image target is calculated by the principle of triangulation based on shift of the image detection information from right and left cameras that configure the stereo camera 13, or calculated based on a detected size or position of a license plate of a vehicle ahead. The distance to the object represents the distance to the object from the vehicle (stereo camera 13) in the traveling direction of the vehicle. The lateral position of the object represents the distance to the object from the vehicle (stereo camera 13) in a direction orthogonal to the traveling direction of the vehicle. The lateral position in the image target also includes information of the range of the object detected from the image in the lateral direction, that is, information of the lateral width of the object. When calculating the target information, processing such as averaging the calculated values may be performed in order to reduce the calculation error.

The combined target generation unit 23 generates a combined target of the object using the target information of the radar target and the image target, that is, the detection result of the radar 12 and the stereo camera 13. The combined target is generated based on the target information of the radar target and the image target by matching both of the targets. Both of the targets are matched based on a similarity degree of the target information in both of the targets, that is, the similarity degree of the distance to the object and the lateral position of the object. The combined target has target information related to the distance to the object and the lateral position of the object (including the lateral width). The target information of the combined target is information based on the target information of the radar target and the image target, and has accuracy higher than that of the target information of the radar target or the image target alone.

Figure 2:
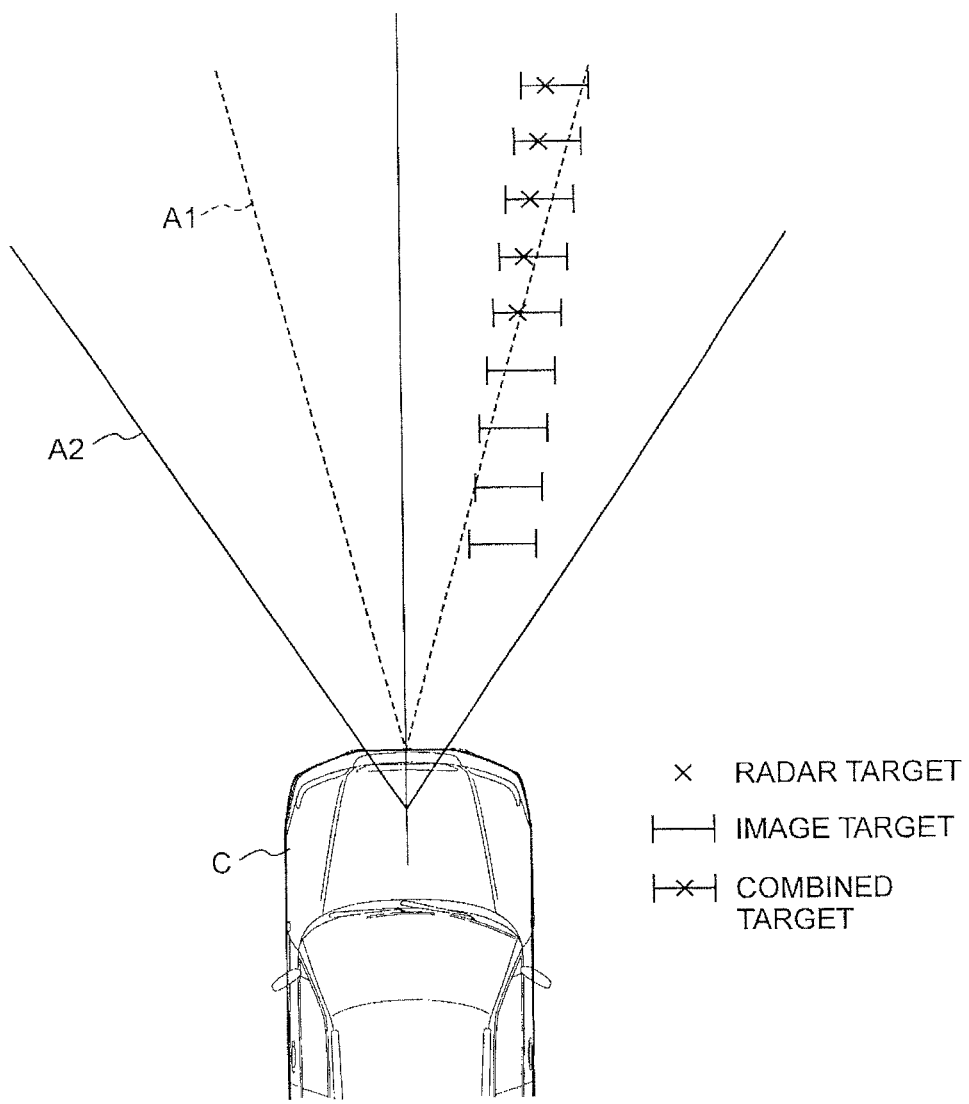
FIG. 2 is a diagram illustrating a detection range of radar and stereo camera.

FIG. 2 is a diagram illustrating detection ranges A1 and A2 of the radar 12 and the stereo camera 13 respectively. As illustrated in FIG. 2, the detection range A1 of the radar 12 is narrower than the detection range A2 of the stereo camera 13. For this reason, obliquely in front of the vehicle C, there exists a range that can be detected by only the stereo camera 13 outside of the detection range A1 of the radar 12. Then, as illustrated in FIG. 2, when an object exists within the detection ranges A1 and A2 of both of the sensors 12 and 13, the combined target is generated, and when the object exists outside the detection range A1 of the radar 12, the combined target is not generated.

Referring back to the description in FIG. 1, the collision determination unit 24 calculates parameters for the collision determination regarding each of the radar target, the image target, and the combined target. As the parameters, for example, a distance to the target, a collision probability, an existence probability, and a lateral position of collision are calculated.

The distance to the target means the distance to the target in the traveling direction of the vehicle, the collision probability means a probability of a collision corresponding to the target, the existence probability means a probability of actual existence of the object which corresponds to the target, and the lateral position of collision means a lateral position (a position in the direction orthogonal to the traveling direction of the vehicle) where the collision with the object which corresponds to the target is predicted. The distance to the target, the collision probability, the existence probability, and the lateral position of collision can be obtained based on the moving state of each target. The parameters of each target are stored in the memory such as RAM over a predetermined period together with the target information of each target, and are read out as needed.

The collision determination unit 24 performs collision determination based on the combined target. In a case where the parameter of the combined target satisfies a predetermined threshold value, the collision determination unit 24 determines the possibility of collision with the object based on whether or not a time to collision is smaller than the threshold value. The time to collision is calculated by dividing the distance to the object by the relative speed of the object (an amount of change of the distance to the object per unit time) using the target information of the combined target. The determination result of the possibility of collision is used for, for example, collision avoidance assist by notifying the driver and by intervention of control of braking or steering the vehicle.

In addition, the collision determination unit 24 performs the collision determination based on the image target when the radar target is not generated and only the image target is generated. The collision determination unit 24 determines the possibility of collision with the object in a case where the parameter of the image target satisfies the predetermined threshold value and based on whether or not the time to collision is smaller than the threshold value. The time to collision is calculated by dividing the distance to the object by the relative speed of the object using the target information of the image target.

Here, the collision determination unit 24 performs the collision determination with the speed (hereinafter, referred to as a longitudinal speed) of the object in the traveling direction of the vehicle as zero when the vehicle decelerates as described below. Here, the speed zero is not zero in a strict sense but includes substantially zero. Specifically, if the longitudinal speed of the object is lower than approximately 1.5 m/s, particularly, lower than approximately 1.0 m/s, the longitudinal speed of the object is assumed to be zero. The speed of the object is an absolute speed which is obtained based on the relative speed of the object and the vehicle speed. The collision determination like this is performed especially in a case where the object is not detected by the radar 12, in a case where the object exists outside the detection range of the radar 12 and within the detection range of the stereo camera 13, or in a case where it is determined that the object is a crossing pedestrian.

Figure 3:
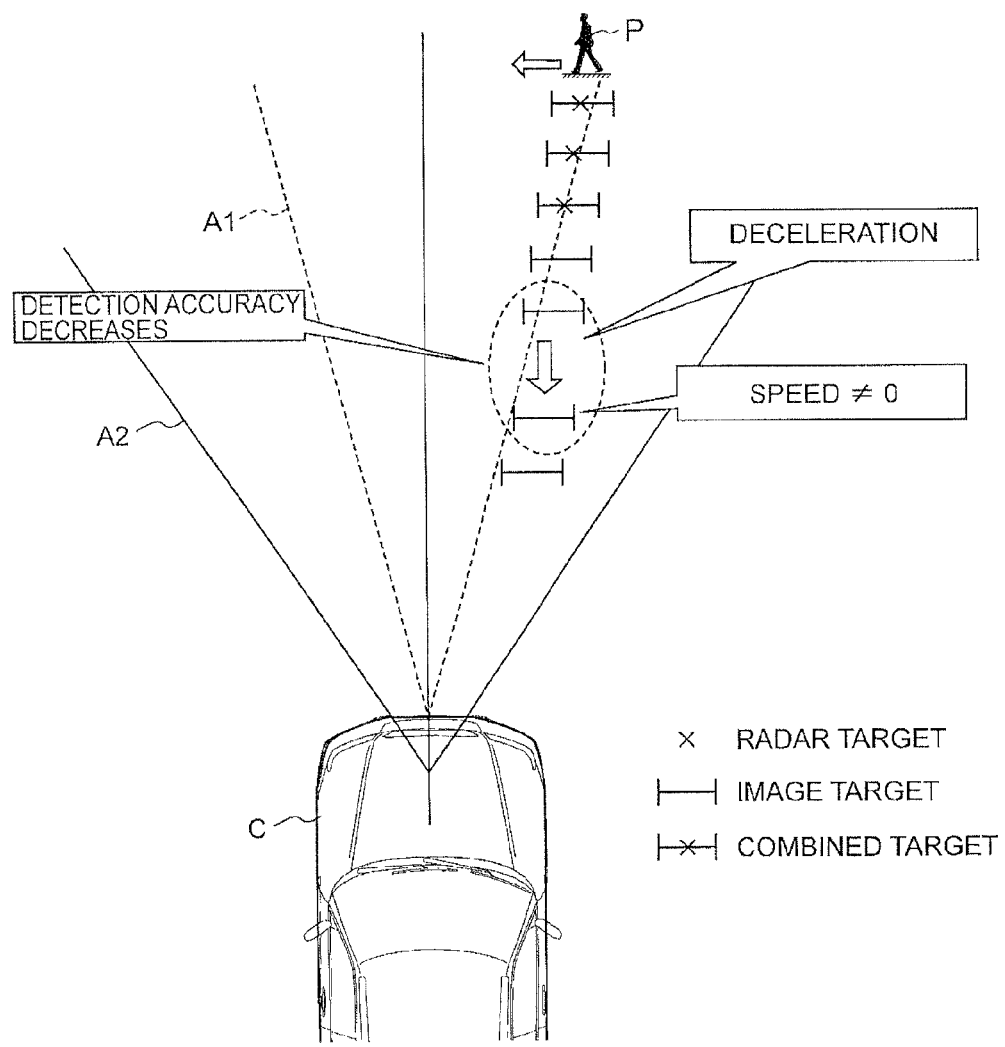
FIG. 3 is a diagram illustrating a situation of assumed collision determination processing.

Next, the operation of the collision determination device will be described referring to FIG. 3 to FIG. 5. First, an assumed collision determination processing will be described referring to FIG. 3. FIG. 3 is a diagram illustrating a situation of the assumed collision determination processing.

In FIG. 3, the detection ranges A1 and A2 of the radar 12 and the stereo camera 13 and the change of the position of the target generated by each of sensors 12 and 13 are illustrated in time series. As the target, a pedestrian P that is crossing in front of the traveling vehicle C is assumed.

The pedestrian P moves so as to approach the vehicle C in the direction crossing the traveling direction of the vehicle C, particularly, orthogonal to the traveling direction of the vehicle C. The pedestrian P is considered as a "stationary object" almost not moving in the traveling direction of the vehicle C. The pedestrian P moves near the boundary of the detection ranges A1 and A2 of both sensors 12 and 13 due to the relative movement of the vehicle C and the pedestrian P. In order to cope with this situation, the processing described below is performed in the collision determination processing described above.

Regarding the image target, a first condition in which the target exists and whether or not the target is tracked as a stationary object is determined. Then, in a case where it is determined that the first condition is satisfied, collision probability of the target is calculated. The collision probability is calculated by obtaining the movement vector of the target based on the movement trajectory of the target for each processing period and obtaining the probability of collision between the vehicle and the object which corresponds to the target based on the movement vector of the target obtained over a plurality of processing periods. Accordingly, the accuracy of the collision probability is improved by the continuous generation of the target. On the other hand, in a case where it is not determined that the target is tracked as the stationary object, the possibility of the target being a stationary object is low. Therefore, collision probability is reset.

Regarding the radar target and the image target, a second condition in which both of the targets exist and whether or not the collision probability of each target exceeds the corresponding predetermined threshold value is determined. Then, in a case where it is determined that the second condition is satisfied, the collision determination is performed based on the time to collision of the combined target. On the other hand, in a case where it is not determined that the second condition is satisfied, the collision determination cannot be effectively performed, and thus, the collision determination is not performed.

Here, in the above-described collision determination processing, for example, as illustrated in FIG. 3, it can be considered that the state detected by the image at the time of deceleration of the vehicle becomes discontinuous. Then, the speed of the object cannot be accurately calculated due to the decrease of the accuracy of tracking, and thus, the image detection accuracy decreases. In addition, as a result thereof, in some cases, the collision probability of the image target is accidentally reset or the collision probability of the image target does not exceed the threshold value. Therefore, collision determination performed based on the result of the image detection is affected.

Next, the operation of the collision determination device will be described referring to FIG. 4 and FIG. 5. FIG. 4 is a flow chart illustrating the operation of the collision determination device. FIG. 5 is a diagram illustrating the situation in the collision determination processing illustrated in FIG. 4.

Figure 4:
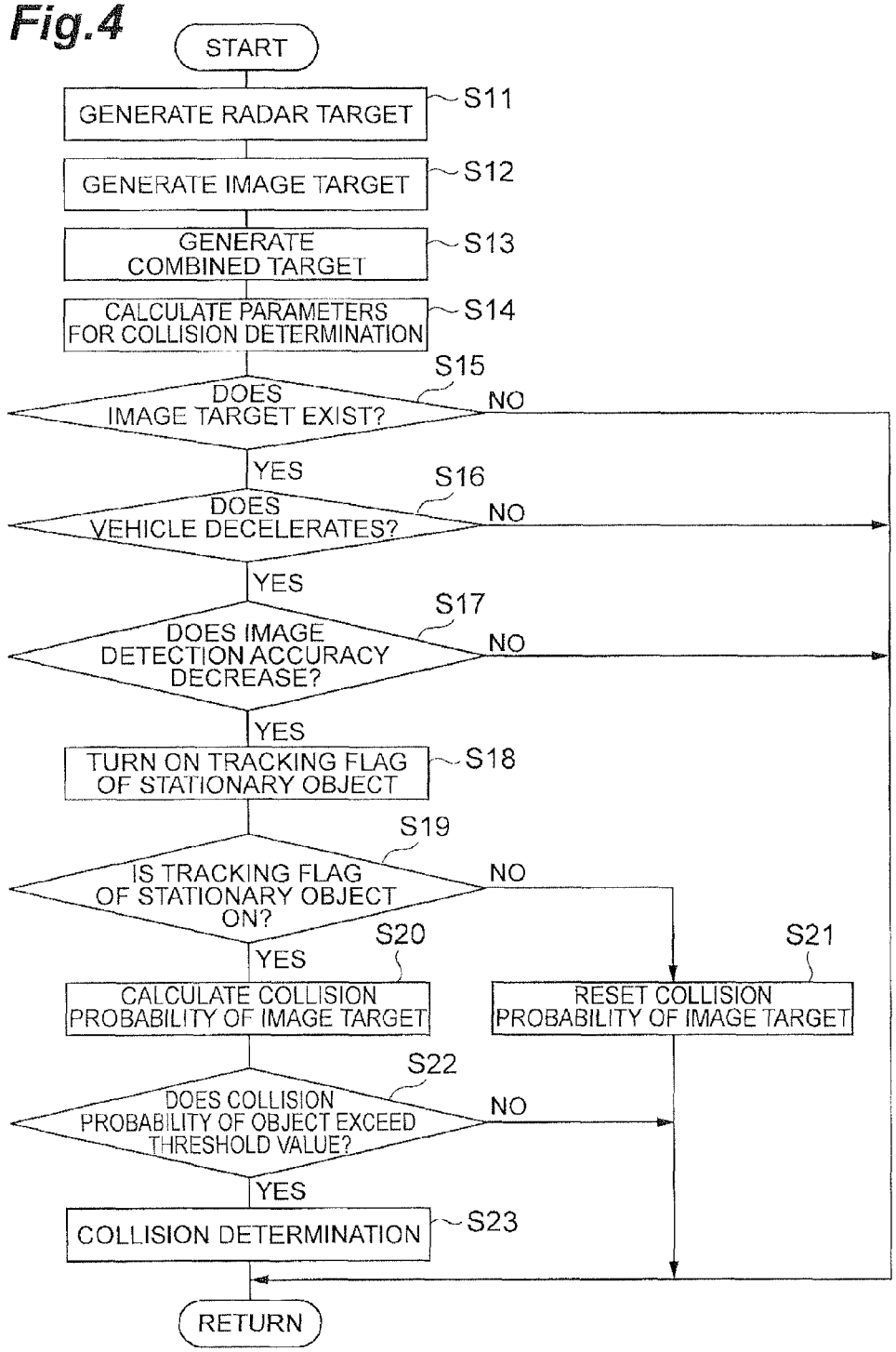
FIG. 4 is a flowchart illustrating an operation of the collision determination device.

As illustrated in FIG. 4, the radar target generation unit 21 generates the radar target in a case where an object exists within the detection range of the radar 12 (STEP S11). The image target generation unit 22 generates the image target in a case where the object exists within the detection range of the stereo camera 13 (S12). The combined target generation unit 23 generates the combined target in a case where matching of the radar target and the image target can be obtained, or does not generate the combined target or releases the combined target generation state in a case where matching of the radar target and the image target cannot be obtained (S13).

The collision determination unit 24 calculates the parameters for the collision determination with regard to each of the radar target, the image target, and the combined target (S14). The collision determination unit 24 determines whether or not the image target exists based on the situation of the image target generation (S15).

In a case where it is determined that the image target exists, the collision determination unit 24 whether or not the vehicle has decelerated, that is, determines whether or not the vehicle is decelerating (S16). Here, this determination is performed based on whether or not a differentiated value of the vehicle speed detected by the speed sensor 11 or a requested deceleration speed used for the control of the traveling of the vehicle (both have negative values) is smaller than the threshold value, or based on whether or not a warning braking, a pre-braking, or an intervention braking is executed.

In a case where it is determined that the vehicle has decelerated, the collision determination unit 24 determines whether or not the image detection accuracy decreases due to the deceleration of the vehicle (S17). This determination is performed by determining, for example, whether or not the movement trajectory of the image target becomes discontinuous, or whether or not the image target is tracked as the moving object.

In a case where it is determined that the image detection accuracy decreases, the collision determination unit 24 turns the tracking flag of stationary object ON (S18). The tracking flag of stationary object is a flag that indicates that the image target is being tracked as the stationary object.

The collision determination unit 24 determines whether or not the tracking flag of stationary object is ON (S19). Then, in a case where it is determined that the flag is ON, the collision determination unit 24 regards the image target as a stationary object and calculates the collision probability of the image target with the longitudinal speed of the image target as zero (S20). Here, the longitudinal speed zero is not zero in a strict sense but includes substantially zero. On the other hand, in a case where it is not determined that the flag is ON, since the possibility that the image target is a stationary object is low, the collision determination unit 24 resets the collision probability of the image target (S21).

Here, in S20, since the image detection accuracy decreases due to the deceleration of the vehicle, the collision determination unit 24 regards the object as a stationary object, and determines the possibility of collision with the longitudinal speed of the object as zero. That is, the collision determination unit 24 calculates the collision probability of the image target with the longitudinal speed of the object as zero without using the longitudinal speed of the object calculated based on the target information of the image target, particularly the change of the distance to the object. Here, the longitudinal speed zero is not zero in a strict sense but includes substantially zero. In this way, it is possible to suppress the influence on the collision determination of the decrease of the image detection accuracy caused by the deceleration of the vehicle.

The collision determination unit 24 determines whether or not the collision probability of the object exceeds the threshold value (S22). Then, in a case where it is determined that the collision probability exceeds the threshold value, the collision determination unit 24 performs the collision determination based on the time to collision of the target (S23).

Here, in a case where the radar target and the image target are generated and the collision probabilities of both targets exceed each of the corresponding threshold values, the collision determination is performed based on the time to collision of the combined target. On the other hand, in a case where only the image target is generated and the collision probability of the image target exceeds the threshold value, the collision determination is performed based on the time to collision of the image target.

In a case where it is not determined that the image target exists in S15, in a case where it is not determined that the vehicle decelerates in S16, or in a case where it is not determined that the image detection accuracy decreases in S17, the processing ends. In addition, in a case where it is not determined that the collision probability of the target exceeds the threshold value in S22 also, the processing ends.

In addition, the collision determination unit 24 may determine whether or not the longitudinal speed before the vehicle decelerates is zero, and in a case where the above condition is satisfied, then, may perform the collision determination with the longitudinal speed at the time of the vehicle deceleration as zero. In this case, for example, before the tracking flag of stationary object is turned ON in S18, the longitudinal speed before the vehicle decelerates is determined. Furthermore, the collision determination unit 24 may perform the above-described determination only in the case where the speed of the object in the direction crossing the traveling direction of the vehicle before the vehicle decelerates exceeds zero. Here, the longitudinal speed zero is not zero in a strict sense but includes substantially zero.

Here, as the longitudinal speed of the target before the vehicle decelerates, any one of the longitudinal speeds of the image target, the radar target, and the combined target may be used. When the longitudinal speed of the image target is used, even in a case where the object is not detected by the radar 12, the collision determination can be performed effectively. When the longitudinal speed of the radar target is used, even in a case where the object is not detected by the radar 12 at the time of the deceleration, the collision determination can be performed effectively using a detection result of the radar 12 from the past. When the longitudinal speed of the combined target is used, even in a case where the combined target is not generated at the time of the deceleration, the collision determination can be performed effectively using a combined target from the past.

Figure 5:
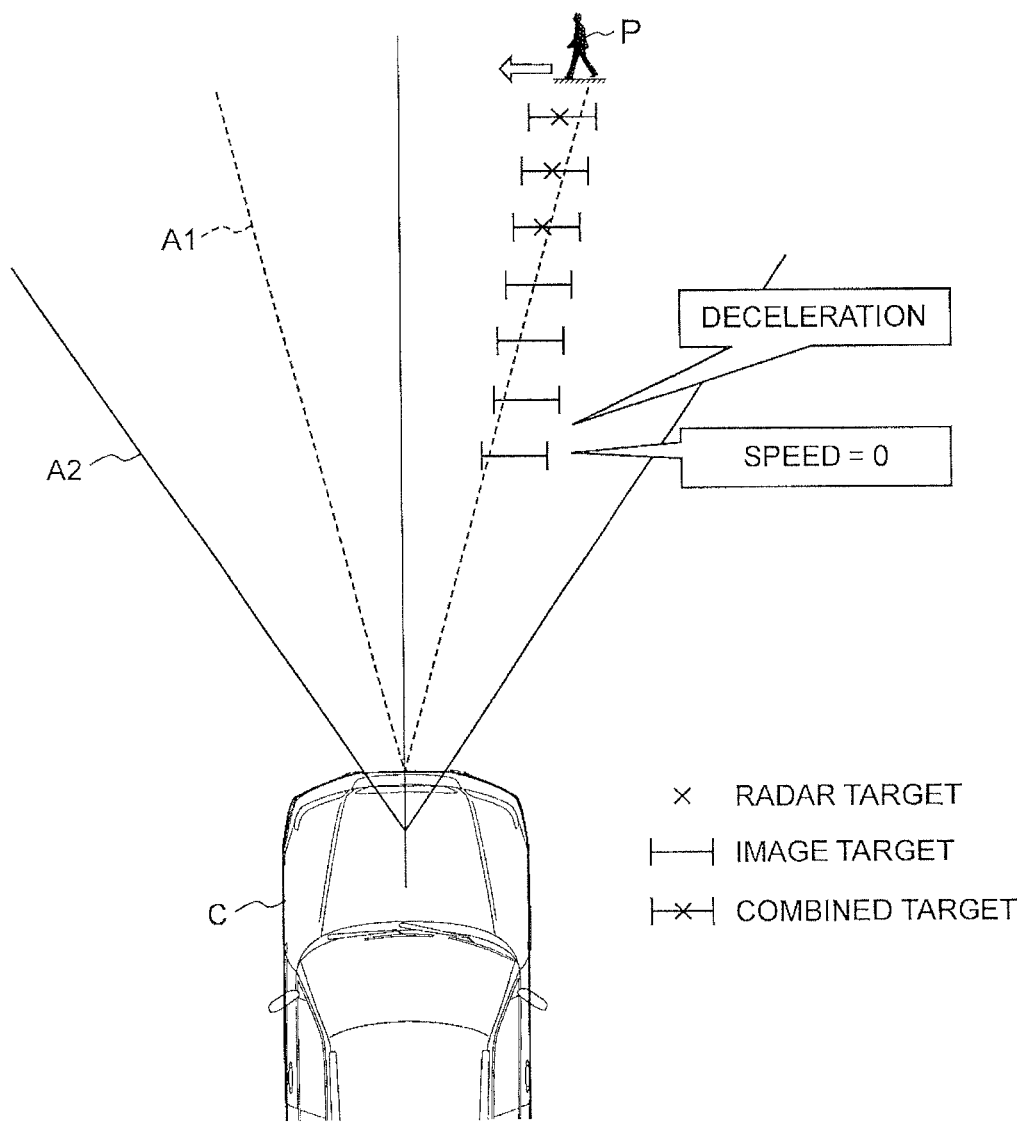
FIG. 5 is a diagram illustrating the operation of the collision determination device illustrated in FIG. 4.

In FIG. 5, the change of the position of the target in the collision determination processing illustrated in FIG. 4 is illustrated in time series in comparison with FIG. 3. In the collision determination processing illustrated in FIG. 4, as illustrated in FIG. 5, the detection state of the object that corresponds to the image target is continuous even when the vehicle C decelerates. That is, even when the tracking accuracy decreases, since the speed of the object is zero, it is possible to suppress the decrease of the image detection accuracy. In addition, as a result, it is also possible to prevent the collision probability of the image target accidentally from being reset, or the collision probability of the image target from not exceeding the threshold value. Therefore, it is possible to suppress the influence on the collision determination performed based on the image detection result.

As described above, according to the collision determination device in the present embodiment, when the vehicle decelerates, since the collision with the object is determined with the speed of the object in the traveling direction of the vehicle as zero, in a case where the determination subject is an object that is almost not moving in the traveling direction of the vehicle such as a crossing pedestrian, even if the image detection accuracy decreases due to the deceleration of the vehicle, an influence on the collision determination can be suppressed.

In addition, based on the detection result of the stereo camera 13, in a case where it is determined that the speed of the object in the traveling direction of the vehicle before the vehicle decelerates is zero, the collision determination may be performed with the speed of the object in the traveling direction of the vehicle as zero when the vehicle decelerates. In this way, even in a case where the object is not detected by the radar 12, the collision determination can be performed effectively.

Furthermore, based on the detection result of the stereo camera 13, in a case where it is determined that the speed of the object in the direction crossing the traveling direction of the vehicle before the vehicle decelerates exceeds zero, the collision determination may be performed with the speed of the object in the traveling direction of the vehicle as zero when the vehicle decelerates. In this way, the collision determination can be performed with high accuracy when confirming that the object is, for example, a crossing pedestrian.

In addition, based on the detection result of the radar 12, in a case where it is determined that the speed of the object in the traveling direction of the vehicle before the vehicle decelerates is zero, the collision determination may be performed with the speed of the object in the traveling direction of the vehicle as zero when the vehicle decelerates. In this way, even in a case where the object is not detected by the radar 12 when the vehicle decelerates, the collision determination can be performed effectively using a past detection result of the radar 12.

In addition, based on the combined target, in a case where it is determined that the speed of the object in the traveling direction of the vehicle before the vehicle decelerates is zero, the collision determination may be performed with the speed of the object in the traveling direction of the vehicle as zero when the vehicle decelerates. In this way, even in a case where the combined target is not generated when the vehicle decelerates, the collision determination can be performed effectively using a past combined target.

In addition, in a case where the object is not detected by the radar 12, the collision determination may be performed with the speed of the object in the traveling direction of the vehicle as zero when the vehicle decelerates. In this way, even in a case where the object is not detected by the radar 12 and the combined target is not generated, the collision determination can be performed effectively.

In addition, in a case where the object exists outside the detection range of the radar 12 and within the detection range of the stereo camera 13, the collision determination may be performed with the speed of the object in the traveling direction of the vehicle as zero when the vehicle decelerates. In this way, even in a case where the combined target is not generated because the object has deviated from the detection range of the radar 12, the collision determination can be performed effectively.

In addition, in a case where it is determined that the object is a pedestrian crossing in front of the vehicle, the collision determination may be performed with the speed of the object in the traveling direction of the vehicle as zero when the vehicle decelerates. In this way, the collision determination can be performed with high accuracy when confirming that the object is, for example, a crossing pedestrian.

In addition, the radar 12 may detect the object in front of the vehicle by a millimeter wave.

The above-described embodiment is the preferred embodiment of the collision determination device and the collision determination method in the present invention, and the collision determination device and the collision determination method in the present invention are not limited to the embodiment described above. In the collision determination device and the collision determination method in the present invention, the collision determination device and the collision determination method may be a device and method in which the collision determination device and the collision determination method are modified without departing from the spirit of the invention disclosed in the Claims attached hereto, or may be applied to another device and method.

For example, in the embodiment described above, the case where the functions of the radar target generation unit 21 and the image target generation unit 22 are realized by the ECU 20 is described. However, the function of the radar target generation unit 21 may be realized by a dedicated ECU, for example, by an ECU for a radar sensor, and the function of the image target generation unit 22 may be realized by a dedicated ECU, for example, by an ECU for an image sensor.

In addition, in the embodiment described above, the case where the detection ranges A1 and A2 of the radar 12 and the stereo camera 13 are symmetrical with respect to the traveling direction of the vehicle and symmetrically overlap is described. However, the detection ranges A1 and A2 of the radar 12 and the stereo camera 13 may partially overlap and may have a region which is not detected by the radar 12 and which is detected by the stereo camera 13. Thus, it is not necessary that the detection ranges A1 and A2 of the radar 12 and the stereo camera 13 be symmetrical with respect to the traveling direction of the vehicle and be symmetrically overlapping.

In addition, in description in the embodiment described above, if the longitudinal speed of the object is equal to or lower than approximately 1.5 m/s, particularly equal to or lower than approximately 1.0 m/s, the longitudinal speed of the object is assumed to be substantially zero. However, the upper limit value of the longitudinal speed of the object for assuming as substantially zero is not limited to approximately 1.5 m/s or approximately 1.0 m/s, but it may be appropriately set as required.

REFERENCE SIGNS LIST 11 speed sensor
12 radar
13 stereo camera
20 ECU
21 radar target generation unit
22 image target generation unit
23 combined target generation unit
24 collision determination unit

The invention claimed is:

1. A collision determination device comprising:
a radar detection unit configured to detect an object in front of a vehicle by a radar wave;
an image detection unit configured to image in front of the vehicle and detect the object by the imaged image; and
a collision determination unit configured to determine a collision probability between the vehicle and the object based on a combined target generated using a detection result of the radar detection unit and a detection result of the image detection unit,
wherein, in a case where it is determined that an absolute speed of the object is zero in a traveling direction of the vehicle before the vehicle decelerates based on the detection result of the image detection unit, the collision determination unit performs collision probability determination with the absolute speed of the object in the traveling direction of the vehicle as zero when it is determined that the vehicle decelerates and detection accuracy of the image detection unit decreases,
wherein, in a case where it is determined that the absolute speed of the object exceeds zero in a direction crossing the traveling direction of the vehicle before the vehicle decelerates further based on the detection result of the image detection unit, the collision determination unit performs the collision probability determination with the absolute speed of the object in the traveling direction of the vehicle as zero when it is determined that the vehicle decelerates and detection accuracy of the image detection unit decreases, and
wherein the absolute speed of the object is obtained based on a relative speed of the object and a speed of the vehicle.

2. A collision determination device comprising:
a radar detection unit configured to detect an object in front of a vehicle by a radar wave;
an image detection unit configured to image in front of the vehicle and detect the object by the imaged image; and
a collision determination unit configured to determine a collision probability between the vehicle and the object based on a combined target generated using a detection result of the radar detection unit and a detection result of the image detection unit,
wherein, in a case where it is determined that an absolute speed of the object is zero in a traveling direction of the vehicle before the vehicle decelerates based on the detection result of the radar detection unit, the collision determination unit performs collision probability determination with the absolute speed of the object in the traveling direction of the vehicle as zero when it is determined that the vehicle decelerates and detection accuracy of the radar detection unit decreases,
wherein, in a case where it is determined that the absolute speed of the object exceeds zero in a direction crossing the traveling direction of the vehicle before the vehicle decelerates further based on the detection result of the radar detection unit, the collision determination unit performs the collision probability determination with the absolute speed of the object in the traveling direction of the vehicle as zero when it is determined that the vehicle decelerates and detection accuracy of the radar detection unit decreases, and
wherein the absolute speed of the object is obtained based on a relative speed of the object and a speed of the vehicle.

3. A collision determination device comprising:
a radar detection unit configured to detect an object in front of a vehicle by a radar wave;
an image detection unit configured to image in front of the vehicle and detect the object by the imaged image; and
a collision determination unit configured to determine a collision probability between the vehicle and the object based on a combined target generated using a detection result of the radar detection unit and a detection result of the image detection unit,
wherein, in a case where it is determined that an absolute speed of the object is zero in a traveling direction of the vehicle before the vehicle decelerates based on the combined target, the collision determination unit performs collision probability determination with the absolute speed of the object in the traveling direction of the vehicle as zero when it is determined that the vehicle decelerates and detection accuracy of the combined target decreases,
wherein, in a case where it is determined that the absolute speed of the object exceeds zero in a direction crossing the traveling direction of the vehicle before the vehicle decelerates further based on the combined target, the collision determination unit performs the collision probability determination with the absolute speed of the object in the traveling direction of the vehicle as zero when it is determined that the vehicle decelerates and detection accuracy of the combined target decreases, and
wherein the absolute speed of the object is obtained based on a relative speed of the object and a speed of the vehicle.

4. The collision determination device according to claim 1,
wherein, in a case where the object is not detected by the radar detection unit, the collision determination unit performs the collision probability determination with the absolute speed of the object in the traveling direction of the vehicle as zero when the vehicle decelerates.

5. The collision determination device according to claim 1, wherein, in a case where the object exists outside a detection range of the radar detection unit and within a detection range of the image detection unit, the collision determination unit performs the collision probability determination with the absolute speed of the object in the traveling direction of the vehicle as zero when the vehicle decelerates.

6. The collision determination device according to claim 1,
wherein, in a case where it is determined that the object is a pedestrian crossing in front of the vehicle, the collision determination unit performs the collision probability determination with the absolute speed of the object in the traveling direction of the vehicle as zero when the vehicle decelerates.

7. The collision determination device according to claim 1,
wherein the radar detection unit detects the object in front of the vehicle by a millimeter wave.

8. A collision determination method,
wherein a detection of an object in front of a vehicle is performed by a radar wave and a detection of the object is performed by an imaged image in front of the vehicle, and
wherein a collision probability between the vehicle and the object is determined based on a combined target generated using a detection result of the radar wave and a detection result of the imaged image, the method comprising:
performing collision probability determination with an absolute speed of the object in a traveling direction of the vehicle as zero when it is determined that the vehicle decelerates and detection accuracy of the imaged image decreases in a case where it is determined that the absolute speed of the object is zero in the traveling direction of the vehicle before the vehicle decelerates based on the detection result of the imaged image,
performing the collision probability determination with the absolute speed of the object in the traveling direction of the vehicle as zero when it is determined that the vehicle decelerates and detection accuracy of the imaged image decreases in a case where it is determined that the absolute speed of the object exceeds zero in a direction crossing the traveling direction of the vehicle before the vehicle decelerates further based on the detection result of the imaged image, and
wherein the absolute speed of the object is obtained based on a relative speed of the object and a speed of the vehicle.

9. A collision determination method,
wherein a detection of an object in front of a vehicle is performed by a radar wave and a detection of the object is performed by an imaged image in front of the vehicle, and
wherein a collision probability between the vehicle and the object is determined based on a combined target generated using a detection result of the radar wave and a detection result of the imaged image, the method comprising:
performing collision probability determination with an absolute speed of the object in a traveling direction of the vehicle as zero when it is determined that the vehicle decelerates and detection accuracy of the radar wave decreases in a case where it is determined that the absolute speed of the object is zero in the traveling direction of the vehicle before the vehicle decelerates based on the detection result of the radar wave,
performing the collision probability determination with the absolute speed of the object in the traveling direction of the vehicle as zero when it is determined that the vehicle decelerates and detection accuracy of the radar wave decreases in a case where it is determined that the absolute speed of the object exceeds zero in a direction crossing the traveling direction of the vehicle before the vehicle decelerates further based on the detection result of the radar wave, and
wherein the absolute speed of the object is obtained based on a relative speed of the object and a speed of the vehicle.

10. A collision determination method,
wherein a detection of an object in front of a vehicle is performed by a radar wave and a detection of the object is performed by an imaged image in front of the vehicle, and
wherein a collision probability between the vehicle and the object is determined based on a combined target generated using a detection result of the radar wave and a detection result of the imaged image, the method comprising:
performing collision probability determination with an absolute speed of the object in a traveling direction of the vehicle as zero when it is determined that the vehicle decelerates and detection accuracy of the combined target decreases in a case where it is determined that the absolute speed of the object is zero in the traveling direction of the vehicle before the vehicle decelerates based on the combined target,
performing the collision probability determination with the absolute speed of the object in the traveling direction of the vehicle as zero when it is determined that the vehicle decelerates and detection accuracy of the combined target decreases in a case where it is determined that the absolute speed of the object exceeds zero in the direction crossing the traveling direction of the vehicle before the vehicle decelerates further based on the combined target, and
wherein the absolute speed of the object is obtained based on a relative speed of the object and a speed of the vehicle.

11. The collision determination device according to claim 2,
wherein, in a case where the object is not detected by the radar detection unit, the collision determination unit performs the collision probability determination with the absolute speed of the object in the traveling direction of the vehicle as zero when the vehicle decelerates.

12. The collision determination device according to claim 2,
wherein, in a case where the object exists outside a detection range of the radar detection unit and within a detection range of the image detection unit, the collision determination unit performs the collision probability determination with the absolute speed of the object in the traveling direction of the vehicle as zero when the vehicle decelerates.

13. The collision determination device according to claim 2,
wherein, in a case where it is determined that the object is a pedestrian crossing in front of the vehicle, the collision determination unit performs the collision probability determination with the absolute speed of the object in the traveling direction of the vehicle as zero when the vehicle decelerates.

14. The collision determination device according to claim 2, wherein the radar detection unit detects the object in front of the vehicle by a millimeter wave.

15. The collision determination device according to claim 3, wherein, in a case where the object is not detected by the radar detection unit, the collision determination unit performs the collision probability determination with the absolute speed of the object in the traveling direction of the vehicle as zero when the vehicle decelerates.

16. The collision determination device according to claim 3, wherein, in a case where the object exists outside a detection range of the radar detection unit and within a detection range of the image detection unit, the collision determination unit performs the collision probability determination with the absolute speed of the object in the traveling direction of the vehicle as zero when the vehicle decelerates.

17. The collision determination device according to claim 3, wherein, in a case where it is determined that the object is a pedestrian crossing in front of the vehicle, the collision determination unit performs the collision probability determination with the absolute speed of the object in the traveling direction of the vehicle as zero when the vehicle decelerates.

18. The collision determination device according to claim 3, wherein the radar detection unit detects the object in front of the vehicle by a millimeter wave.

* * * * *